United States Patent [19]

Tepper

[11] 4,026,068
[45] May 31, 1977

[54] SUPPORT FOR A TOMATO PLANT

[76] Inventor: Seymour Tepper, 2000 Lilac Drive, Westbury, N.Y. 11590

[22] Filed: Dec. 8, 1975

[21] Appl. No.: 638,557

[52] U.S. Cl. .................................... 47/45; 47/47
[51] Int. Cl.² .................................... A01G 9/12
[58] Field of Search .................... 47/42–47

[56] References Cited

UNITED STATES PATENTS

| 587,581 | 8/1897 | Horan | 47/47 |
| 871,901 | 11/1907 | Walton | 47/47 X |
| 2,557,731 | 6/1951 | Felsing | 47/47 |
| R2,896 | 3/1868 | Wilcox | 47/47 |

FOREIGN PATENTS OR APPLICATIONS

| 1,275,555 | 12/1961 | France | 47/47 |
| 1,467,865 | 2/1967 | France | 47/47 |
| 814,071 | 9/1951 | Germany | 47/44 |
| 399,065 | 2/1942 | Italy | 47/47 |
| 9,018 | 6/1915 | United Kingdom | 47/47 |
| 458,514 | 12/1936 | United Kingdom | 47/47 |

*Primary Examiner*—Edgar S. Burr
*Assistant Examiner*—Steven A. Bratlie
*Attorney, Agent, or Firm*—Bauer, Amer & King

[57] ABSTRACT

A tomato plant support which uses plural stakes or uprights in surrounding relation about the plant and lateral members extending from these stakes to support the tomato-laden vines of the plant, but wherein the lateral members are intentionally not continuous, as is the case in prior art counterparts. Specifically, the discontinuity, or openings in the vine support structure, facilitate the relocation of each vine from a lower to a higher elevation support, in response to the growth of the plant.

1 Claim, 5 Drawing Figures

SUPPORT FOR A TOMATO PLANT

The present invention relates to an improved support for a tomato plant, and more particularly to a support which obviates manipulating the plant, to provide it with its supported position thereon, which might possibly cause damage to the plant.

A typical prior art structure for supporting a tomato plant or the like, as described in U.S. Pat. No. 2,009,867, includes several elevations of ring-like members which provide support to the tomato-laden vines of the plant. While this structure is generally satisfactory, it may readily be appreciated that as the plant grows, the vines may require relocation from a lower to a higher located ring, and said structure does not particularly facilitate or contribute to achieving this relocation.

Broadly, it is an object of the present invention to provide an improved tomato plant support overcoming the foregoing and other shortcomings of the prior art. Specifically, it is an object to provide a support structure which readily holds the tomato plant in an erect supported condition, and also enables suitable adjustments in the supported position of the plant as may be required, from time to time, as the plant grows.

An improved support for a tomato plant or the like demonstrating objects and advantages of the present invention includes, in a preferred embodiment, three upright supports circumferentially spaced in surrounding relation about a centrally located tomato plant. A ring-like member is attached in interconnecting relation adjacent the upper ends of these upright supports or stakes, and laterally oriented vine-supporting members are attached at three selected elevations to extend from these stakes. More particularly thse vine-supporting members extend only into close proximate relation with each other so that adjacent cooperating pairs of these members bound an access opening into the central area bounded by the support structure. As a consequence, the vine-supporting members provide the support intended and also allow movement of the vines through the access openings preparatory to relocating a vine from a member at a lower elevation on to a member at a higher elevation. Thus, the relocated vine does not have to be bent, or otherwise harshly handled, during any relocation necessitated by its growth.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 2 is a perspective view of the support, said tomato plant being illustrated in phantom perspective;

FIG. 3 is a plan view, in section taken on line 3—3 of FIG. 2, showing further structural details;

FIG. 4 is a front elevation view of one of the upright supports; and

FIG. 5 is a partial front elevational view illustrating the manner in which a tomato-laden vine is moved to a support at a higher elevation.

Figure 1:
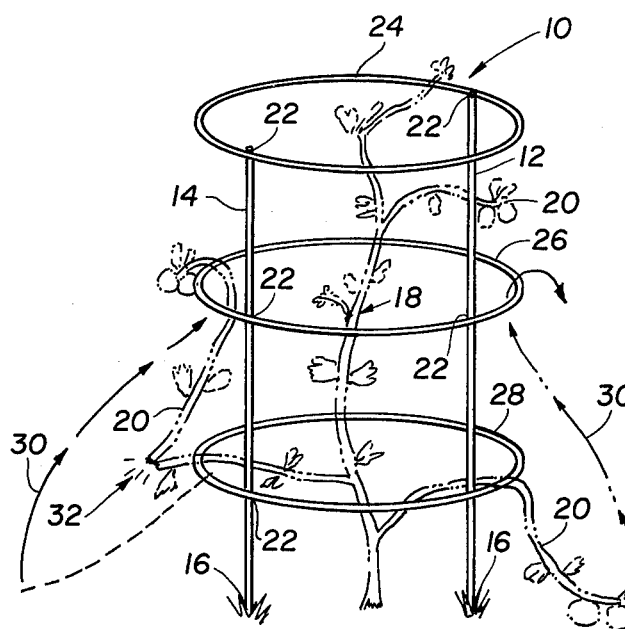
FIG. 1 is a perspective view of a typical prior art support for a tomato plant.
Figure 3:
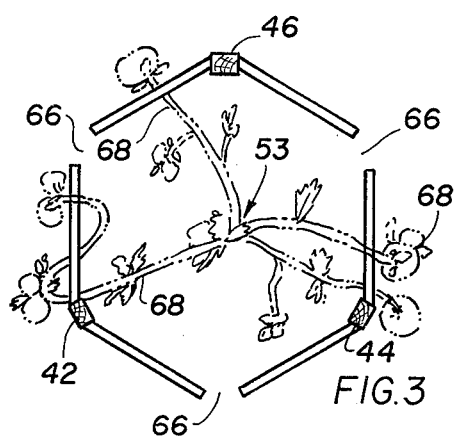
FIGS. 2–5 illustrate a tomato plant support which is an improvement over that illustrated in FIG. 1. Specifically.
Figure 2:
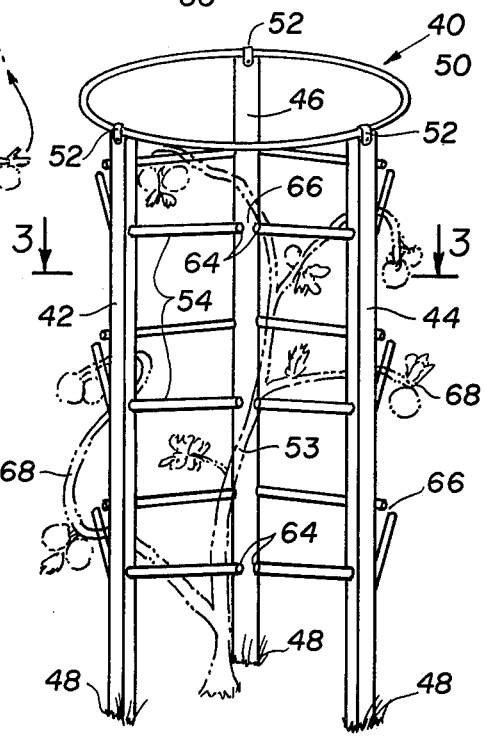
Figure 4:
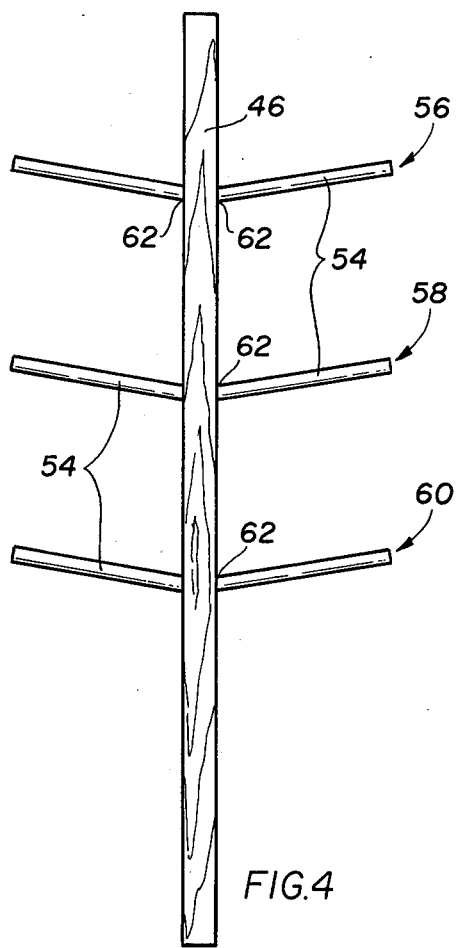

In the drawings, the improved tomato plant support according to the present invention is illustrated in FIGS. 2–5, the same having significant and noteworthy features over its prior art counterpart as illustrated in FIG. 1. Specifically, as illustrated in FIG. 1, the conventional support, generally designated 10 therein, includes uprights 12 and 14 inserted into the ground, as at locations 16, and thereby surrounding the tomato plant 18. To support the tomato-laden vines 20 of plant 18, the uprights 12 and 14 typically have appropriately connected to them, as at the locations 22, three vine-supporting rings 24, 26 and 28. As may generally be appreciated, all of the rings are utilized to support the tomato-laden vines 20 during different growing stages of the plant 18. That is, ring 28, or the lowermost ring, initially supports the vines 20. However, as these vines grow, it is necessary to loop them over the next elevation level, or ring 26, in order that the tomatoes on the vine 20 are held out of contact with the moist growing soil. In FIG. 1, the reference line 30 illustrates how a vine 20 is typically removed from its supported position over the lower ring 28 to the next higher ring 26. In this connection, at the lefthand side of FIG. 1, it is further illustrated that during movement 30 it is possible to cause damage, as at 32, to the vine 20 because of the severe radius of bend that is is subjected to during the movement of the vine within the central area of the support 10 and the relocation thereof over the ring at the next level of elevation.

FIGS. 2–5 illustrate the within improved support, generally designated 40, which obviates the foregoing and other shortcomings of prior art supports, and in particular obviates any possibility of damage being caused to the vine during its relocation at higher elevation levels which are required by growth of the plant. Support 40 includes, in a preferred embodiment, three upright supports or stakes 42, 44 and 46, each driven into the soil, as at 48, so as to assume a generally vertical orientation, as illustrated. The rigidity of the structure is enhanced by an upper ring-like member 50 appropriately attached, as at 52, to each of the stakes. As a result, the structure 40, comprised of the circumferentially spaced stakes 42, 44 and 46, set at approximately 120° from each other, surrounds the centrally located tomato plant 53. Up to this point in the description the improved support 40 is substantially like the prior art support 10.

Figure 5:
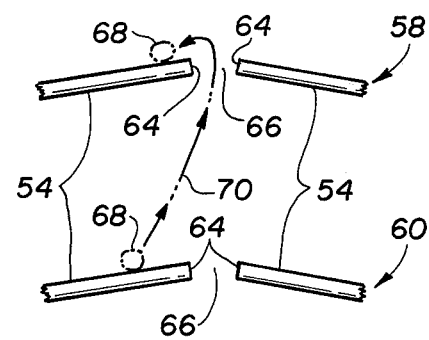

Representing a significant departure from the prior art, support 40 includes significantly different and improved vine-supporting structural members, individually and collectively designated 54. Specifically, and as is perhaps best illustrated in FIG. 4, the members 54 are arranged at three elevation levels, generally designated 56, 58 and 60 on each of the stakes 42, 44 and 46 (stake 46 being used for illustrative purposes in FIG. 4). Specifically, each member 54 extends, as at 62, from its attachment to its cooperating stake in a laterally extending orientation and in a slightly rising attitude to the horizontal, all as is clearly illustrated in FIG. 4. As is perhaps best illustrated in FIGS. 2 and 5, the free ends, individually and collectively designated 64, of the members 54 are positioned in close proximate relation to each other so as to bound therebetween an access opening 66 from the exterior into the central interior area bounded by the support 40. As a result, and as is illustrated in FIG. 5, when it is necessary to relocate a tomato-laden vine 68 from a lower to a higher elevational support, this vine is readily moved, as along the path 70, from the lower level 60 to the higher level 58 by being passed through the access opening 66 of level 58 and then looped over the supports 54 located at this level. As a consequence, at no time is the vine 68 manipulated through a small radius bend which could possibly cause damage to it, as at 32, as previously described in connection with the prior art support 10 of FIG. 1.

In addition to the members 54 bounding the access openings 66 to facilitate relocation of the tomato-laden vine 68 at different elevations as these vines grow, as just described, it will also be noted that the interruption in the elevational support which results from providing the openings 66 also enables each member 54, a already noted, to be set at a slightly rising inclination which, in practice, has been found helpful in maintaining the position of the vines 68 in their loped, supported condition over the members 54.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A support for the tomato-laden vines of a tomato plant comprising three parallel upright supports circumferentially spaced in facing relation to each other so as to bound a centrally located growing area for a tomato plant, a ring member attached in interconnecting relation adjacent the upper ends of said upright supports, and means for adjustably supporting said tomato-laden vines so that a vine may be relocated from one elevation to a different elevation, said means consisting of supporting members attached to each of said upright supports in a cantilever manner with the free ends being slightly raised and extending so as to substantially bound said growing area, the supporting members of adjacent upright supports extending substantially towards each other and being of such a length that a gap is defined between their free ends, said gap enabling relocation of a vine from one support to another support at a different elevation.

* * * * *